Dec. 2, 1958        A. L. WING        2,862,765
INSECTICIDE FOG SYSTEM
Filed Jan. 3, 1956
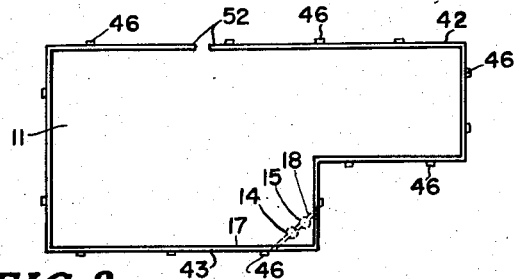
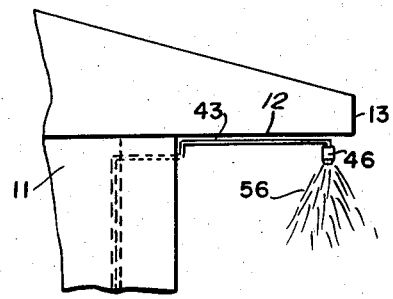
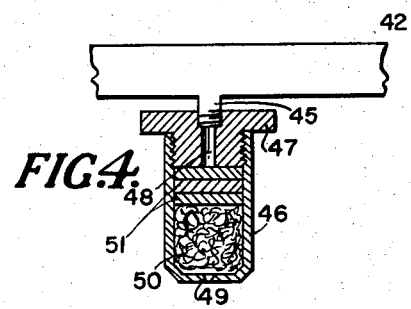
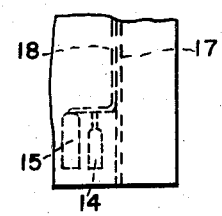
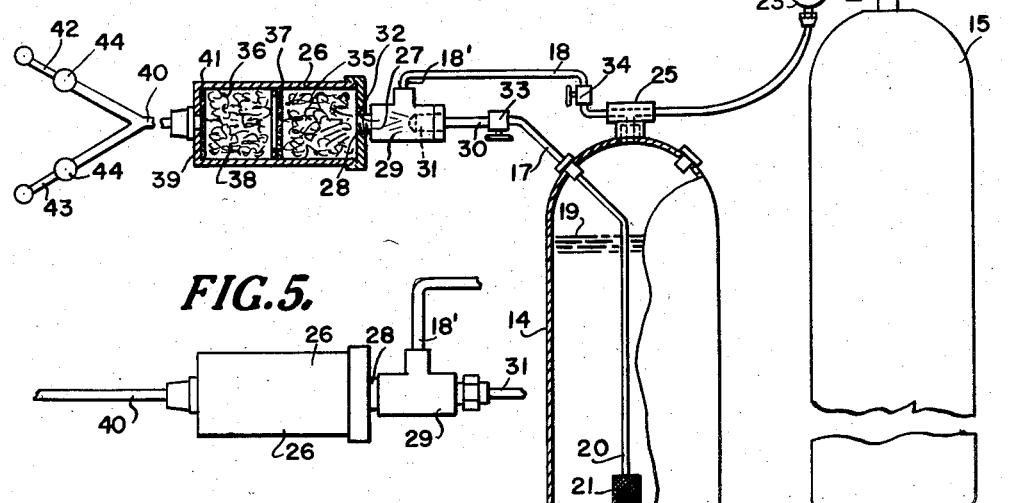
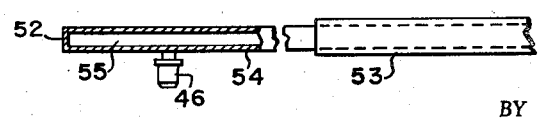
INVENTOR
ARCHIE L. WING
BY
ATTORNEYS

United States Patent Office 2,862,765
Patented Dec. 2, 1958

2,862,765

INSECTICIDE FOG SYSTEM

Archie L. Wing, Clearwater, Fla.

Application January 3, 1956, Serial No. 556,982

5 Claims. (Cl. 299—86)

The present invention relates to an improved apparatus for exterminating flying insects and the like which are particularly bothersome to human beings.

It has been found that dispersing insecticides in the form of a spray or solid stream does not insure the extermination of flying insects and that the most efficient way to eradicate or kill these pests is by using a liquid or fluid insecticide in the form of a fog or thin mist. In other words while a spray will kill insects, it does not cover as large an area as a fog or mist. It might be mentioned that there are various classifications ranging from vapors to sprays, according to the micron size of the broken particles of the insecticide. The present invention uses what is classified as a fog or mist having a micron particle size of 0.1 to 100 microns. A spray on the other hand, ranges from 100 microns to 400 and has been found to be more wasteful of materials and injurious to grass and foliage.

Accordingly, an important object of the invention is to provide a simple, efficient, compact, and economical apparatus or fogging system for exterminating flying insects and the like, by means of spaced fog nozzles. For the purposes of illustration, the fogging assembly is shown associated with the roof of a building and extends around the cornice or eaves. Manifestly, the spraying system may be located at any other suitable point depending upon the type of building and where it can be best located to exterminate insects, such as mosquitoes, which quite frequently collect near doorways and windows. The fogging nozzles are positioned at a proper height and directed to cover a substantial area so as to discharge and spread out the insecticide under pressure in the form of a thin mist or fog and thus efficiently serve as an insect repellent and exterminator.

A further object comprehends the provision of a spraying assembly including an emulsifying housing with which communicates a fitting that in turn is connected to an insecticide tank and a separate propellant gas tank. The emulsifying housing communicates with a flexible tubing having spaced nozzles for discharging the insecticide in the form of a thin mist or fog. Means are provided for selectively communicating the gas tank with the insecticide tank. Additionally, means are provided for selectively controlling the flow of the insecticide and the gas propellant into the fitting.

A further object is to provide an improved method of applying insecticide in the form of a fog or thin mist so as to kill insects, such as mosquitoes and the like. The insecticide is discharged through suitable spaced nozzles which are located at a sufficient height to disperse the mist or fog over a wide area and at any angular position that may be desired.

Other objects and advantages of the invention will become apparent from the following description, when taken in conjunction with the accompanying claims and drawings.

Referring to the drawings in which are shown preferred embodiments of the invention:

Figure 1 is a side elevational view, with parts in section, of a flying insect exterminator apparatus or fog assembly constructed in accordance with the present invention;

Figure 2 is a side view of an end portion of a building showing the apparatus associated therewith;

Figure 3 is a diagrammatic plan view of a building showing the apparatus encircling the building adjacent the roof thereof;

Figure 4 is a detailed sectional view of one of the discharge nozzles;

Figure 5 is a detailed sectional view of a modification of the supply tubing; and Figure 6 is a detailed side view, with parts in section, showing the varying diameters or size of the sections of the discharge tubing.

Referring to the drawings, 11 indicates a building, such as a home or the like, 12 the cornice, and 13 the eaves extending downwardly from the roof (Fig. 2). In any suitable part of the building, such as the basement, there is positioned an insecticide container or tank 14 (Fig. 1) and a gas propellant container 15. The tanks 14 and 15 may rest on the floor of the building or, if of small size, they may be hung on the wall since the apparatus is not dangerous and the gas used is non-explosive. To the tanks 14 and 15 are connected tubings 17 and 18 respectively, which may be formed of plastic, copper, or the like. The tubing 17 extends into the insecticide container for withdrawing a suitable flowing insecticide 19 that is highly lethal to flying insects but not to humans. The lower end portion 20 of the tube 17 in the container 14 may have a strainer 21 connected thereto. An activator of piperonyl butoxide may be added to the insecticide for the purpose of making it easier for the insects to breathe it in.

Within the container 15 is a suitable gas propellant, such as carbon dioxide ($CO_2$), compressed air, Freon gas, nitrogen gas or any other non-explosive propellant. The carbon dioxide or other gas in the container 15 is maintained at a pressure of about 125 pounds and varies in accordance with the size of the building and the length of the tubing with which the apparatus is to be used. A valve 22 is positioned in the top of the container 15 for controlling the flow of the gas into the pressure regulator 23 which communicates with the tubing 18 and with which may be connected a pressure indicator 24. The tubing 18 is connected through a tubular T fitting or coupling 25 with the insecticide container 14, so as to force the insecticide from the container 14 into the tubing 17. An elongated emulsifying housing or cylinder 26 is provided at one end with an opening 27 into which extends a threaded reduced end 28 of a substantially T-shaped fitting or coupling member 29. The tubing 17 has an end portion 30 which extends into the fitting 29 and is provided with a nozzle 31 having a very fine discharge orifice. The tubing 18 extends into the fitting 29 through one side thereof as at 18' and in front of the discharge orifice 31 so as to provide a chamber 32 in the fitting where the insecticide and air are selectively delivered prior to being introduced into the housing 26. A manually operable valve 33 is connected to the tubing 17 in front of the fitting 29 so as to regulate the flow of the insecticide from the container 14 into the fitting, through the nozzle 31. The gas tubing 18 is also provided with a manually controlled valve 34 positioned between the coupling 25 and the fitting 29 for regulating the flow of the propellant gas into the chamber 32. The valves 33 and 34 are normally closed, so that the gas pressure in the tank 15, when the latter communicates with the tubing 18, communicates through the fitting 25 with the container 14 to force the insecticide 19 through the tubing 17 and into the closed valve 33. It will be seen that, upon opening of the valve 33, the fluid or liquid insecticide 19 passes through the fitting 29 into the housing 26. The restricted nozzle 31 serves as a fluid control means for the flow of the insecticide into the fitting 29 when the valve 33 is turned on.

The housing 26 is preferably formed into two charging chambers 35 and 36 which may be separated centrally by a bronze screen or reticulated member 37 (Fig. 1). Within each of the chambers 35 and 36 is positioned any suitable atomizing means, such as cotton fibers or the like 38, for breaking down the insecticide as it passes through the housing. The outer or opposite end 39 of the housing 26 communicates with a flexible discharge tubing 40. The chamber 36 adjacent the end 39 is provided with a bronze screen or reticulated member 41, so as to provide means for further preventing the discharge of the fibers 38 with the insecticide. After the chambers 35 and 36 are charged with the insecticide fluid 19, the valve 33 is closed and valve 34 is opened to allow the carbon dioxide gas in the tank 15 to flow under pressure through the tubing 18 into the fitting 29 and the chamber 32, so as to force the insecticide in the housing 26 through the fibers 38 and into the discharge tubing 40. The carbon dioxide and the insecticide are mixed with each other in the housing 26, so as to form an insecticide emulsion, which discharges into the tubing 40. The discharge tubing 40 may communicate with branch tubing 42 and 43 which are provided with the manual control valves 44 for regulating the flow of the insecticides therethrough. The branch tubings 42 and 43 are of small diameter and, as shown, extend around the outside of the building 11 in opposite directions (Fig. 3), so as to be spaced from the cornice 12 and the eaves 13. At longitudinally spaced intervals, the tubings 42 and 43 are provided with depending threaded nipples 45 (Fig. 4) to which are connected the discharge nozzles 46 through removable threaded caps or plugs 47. Each of the plugs 47 has an axial opening 48 which communicates with the nipple 45 and the inside of each of the nozzles 46. The location of the nozzles will, of course, depend on the type of the building with which the assembly is to be installed. Since insects, such as mosquitoes and the like, hide in areas which are protected from wind and breezes, the nozzles 46 are shown spaced from the cornice and located at such a height that the fog will hit the ground and spread over a substantial area. The nozzle assembly may be conveniently located at other parts of the building, such as near screen doors, windows, or the like, so as to kill insects that might enter the building when the door is opened.

The bottom of the nozzles 46 has a restricted discharge aperture 49. Within the nozzle 26 is positioned a suitable fiber, such as cotton, 50 to further atomize or break down the insecticide prior to its discharge through the aperture 49 in the form of a thin mist or fog. The fiber also provides means for preventing clogging of the nozzle aperture 49. One or more solid filters 51 may be positioned within each of the spray nozzles 46 and may be formed of any suitable material, such as filter paper, blotting paper or the like. The number of filters used will vary in accordance with the number of nozzles associated with the tubings 42 and 43 and their distance from the emulsifying housing 26. Any suitable fluid insecticide 19 may be used, preferably one with an oil base, but which is stepped up to a high "knock down" power. Such an insecticide is desirable due to the fact that the use of carbon dioxide ($CO_2$) in high proportions dilutes the insecticide to such an extent that its killing powers are greatly reduced. In any event, the insecticide must be highly lethal to flying insects but not toxic to human beings. The ends of the branch tubing 42 and 43 are closed and spaced as at 52 (Fig. 3). Each of the plugs 47 is readily removable so as to permit convenient access into the interior of the fogging nozzle 46 to insert or remove the fibers or filters therein.

In Figure 5, the emulsifying housing 26 communicates with the discharge copper tubing 40 which, instead of being branched as in Figure 1, may be in the form of a continuous one-piece or sectional flexible tubing that extends around the building spaced from the cornice and eaves. The fogging nozzles 46 may be uniformly distributed along the tubing 40 similar to their connection with the branch tubings 42 and 43. By reason of the tubing 40 extending continuously around the premises, means are provided for allowing the useless gas or air to escape and also for preventing blocking of the supply pipes which would result in poor fogging through the discharge nozzles. In other words, the fogging of one side of the building at a time allows the useless gas or air to escape to the side which is not being fogged. When the discharge nozzles 46 on one side of the house are to be fogged, sufficient time must be allowed for the gas or air to escape to the other side of the building; otherwise, the supply pipes will be blocked by the pressure present and thus prevent the proper discharge of the insecticide.

The supply tubings 40, 42 and 43, are preferably in the form of sections 53 and 54 (Fig. 6) to which are connected at spaced intervals the fogging nozzles 46. The sections of the tubing 53 nearest the emulsifying housing 26 are of larger internal diameter than the hollow bore 55 of the outer section 54 adjacent the closed ends 52, so as to provide means for increasing the rapidity of flow of the insecticide and the volume of insecticide admitted to the ends of the branch tubing 42 and 43. Thus, means are provided for insuring a uniform discharge of the insecticide in the form of a very fine mist or fog 56 (Fig. 2), so as to paralyze the breathing of flying insects and their quick extermination when subjected to the fine mist of the emulsified insecticide.

In operation, it will be seen that when the valve 34 is closed and the valve 22 opened, the high pressure carbon dioxide gas is introduced into the insecticide container 14. Upon the opening of the valve 33 the insecticide is forced through the fitting 29 and into the emulsifying housing 26. The valve 33 is then closed and the valve 34 opened so as to force the insecticide into the housing 26 and through the discharge tubing 40. The supply of the emulsified insecticide as it discharges from the housing 26 into the tubing 40 and the branch tubing 42 and 43, is controlled by the valves 44 which preferably are alternately operated, so as to fog one-half of a building at a time rather than by a continuous operation, since this method of procedure has been found more economical and faster than operating a long single or continuous line, such as shown in Figure 5. The spaced bronze screening 37 and 41 in the housing 26 prevents the cotton fibers 38 from entering the tubing 40 and the branch connections 42 and 43 with the insecticide emulsion.

It has been found that a liquid insecticide which merely forms a spray or solid stream is not as efficient as an insecticide in the form of a thin mist or fog for killing or exterminating flying insects of the type particularly annoying to human beings. The present apparatus or spraying assembly allows the limited use of a suitable propellant gas, such as carbon dioxide, and a liquid insecticide that quickly kills flying insects but is not harmful to human beings. Heretofore, devices of this character required the use of large quantities of cheap and dangerous insecticides as contrasted to the simple, efficient, compact, and economical fogging assembly embodied in the present invention. The fibers 50 of each of the discharge nozzles 46 serve to further atomize or break down the insecticides and also prevent clogging of the discharge apertures 49. The filters 51 vary in number in accordance with the distance the discharge nozzles 46 are located from the emulsifying chamber 26. The size and dimension of the various parts may vary in accordance with the particular size of the building or part, the fogging assembly is used.

The fogging of a building is preferably performed by a batch cycle from time to time rather than by a continuous operation. In other words, a continuous fogging of a building has been found not to be as practical or as economical as fogging one-half of the building, since it takes only a few seconds to fog the entire side of a building and then switch to the other side by the selective control of the valves 44. The smaller diameter of the end sections 54 of the supply tubing provides means for increasing the rapidity of flow and the volume of the insecticide admitted to the ends of the lines, so as to insure uniform distribution and discharge of the insecticide around the cornice or edges of the building being treated.

The fibers 38 and 50 may be formed of any suitable material, such as cotton or Fiberglas, that will hold a load of insecticide and at the same time be easily released upon application of carbon dioxide or other suitable propellant gas. While the housing 26 is shown formed of two separate chambers or compartments 35 and 36, it will be manifest that this number may be increased so that each section is separated by an air space and a bronze screen to prevent picking up of the fibers or the slowing down of the delivery of the insecticide to the discharge tubing 40 and the fogging nozzles 46.

Thus it will be seen that simple, efficient, and positive means are provided for exterminating insects, such as mosquitoes or the like, by applying an insecticide in the form of a fog or mist over the area to be treated by causing the insects to breathe in the insecticide. The fog assembly is preferably located adjacent the eaves so as to position the nozzles at such a height as to cause the fog to be dispersed over a wide area. Of course, the location of the nozzles will depend on the type of building with which the assembly is to be associated. While the cornice has been found to be the best place for locating the nozzles it is not the only place, and they may be conveniently positioned at any point so as to spread the fog over a substantial area. It will be manifest that the fog assembly may be associated with various types of buildings and vehicles, such as warehouses, garages, barns, dairies, airplanes, etc.

It will be understood that the forms of the invention shown and described are merely illustrative and that such changes may be made as come within the scope of the following claims.

I claim:

1. An insect spraying assembly including in combination, an insecticide tank, a gas propellant tank, a housing, a fitting communicating with said housing, tubular means interconnecting the fitting with said gas tank, tubular means interconnecting the insecticide tank with said fitting means interconnecting the gas propellant tank with said insecticide tank, a discharge tubing provided with spaced fogging nozzles, said housing having spaced bronze screens therein for separating the same into compartments, each of said compartments having fibers therein for treating the insecticide as it passes therethrough, and valve means located in at least one of said tubular means for selectively controlling the flow of the propellant gas and the insecticide into said fitting so as to discharge the insecticide through said nozzles in the form of a mist.

2. An insect spraying assembly as called for in claim 1, in which each of the fogging nozzles is provided with fiber means for further cleaning the insecticide prior to its discharge therethrough.

3. An insect spraying assembly as called for in claim 1, in which the tubing is in the form of connected sections, the sections adjacent the housing being of larger internal diameter than those remote therefrom.

4. An insect spraying assembly including in combination, an insecticide container, a gas propellant container, a housing, a fitting having a delivery chamber communicating with said housing, said housing having spaced bronze screens separating the same into compartments, each of said compartments having fibers therein for treating the insecticide as it passes therethrough, tubular means interconnecting said chamber with said gas container, tubular means interconnecting the insecticide container with said chamber, means interconnecting the gas propellant container with said insecticide container, a discharge tubing provided with spaced fogging nozzles, said nozzles arranged to discharge the insecticide in the form of a thin mist, and manually operable valve means located in each of said tubular means for selectively controlling the flow of the propellant gas and the insecticide into the said fitting.

5. An insect spraying assembly including in combination, an insecticide container, a gas propellant container, a housing, a fitting having a delivery chamber communicating with said housing, said housing having spaced bronze screens separating the same into compartments, each of said compartments having fibers therein for treating the insecticide as it passes therethrough, and each of the fogging nozzles being provided with fibers and filters for further treating the insecticide prior to its discharge from the fogging nozzles, tubular means interconnecting said chamber with said gas container, tubular means interconnecting the insecticide container with said chamber, means interconnecting the gas propellant container with said insecticide container, a discharge tubing provided with spaced fogging nozzles, said nozzles arranged to discharge the insecticide in the form of a thin mist, and manually operable valve means located in each of said tubular means for selectively controlling the flow of the propellant gas and the insecticide in the said fitting.

References Cited in the file of this patent

UNITED STATES PATENTS

| | | |
|---|---|---|
| 222,888 | Garland | Dec. 23, 1879 |
| 450,091 | Woolley | Apr. 7, 1891 |
| 577,525 | Brochet | Feb. 23, 1897 |
| 1,288,123 | Mowry | Dec. 17, 1918 |
| 1,488,125 | Kline | Mar. 25, 1924 |
| 1,619,183 | Bradner | Mar. 1, 1927 |
| 1,675,184 | Loepsinger | June 26, 1928 |
| 1,792,860 | Neuls | Feb. 17, 1931 |
| 2,201,995 | Erickson | May 28, 1940 |
| 2,246,731 | Hill | June 24, 1941 |
| 2,550,164 | Rich | Apr. 24, 1951 |